United States Patent
Bondi et al.

(10) Patent No.: US 12,293,773 B2
(45) Date of Patent: May 6, 2025

(54) AUTOMATICALLY SELECTING A SOUND RECOGNITION MODEL FOR AN ENVIRONMENT BASED ON AUDIO DATA AND IMAGE DATA ASSOCIATED WITH THE ENVIRONMENT

(71) Applicant: Robert Bosch GmbH, Stuttgart (DE)

(72) Inventors: Luca Bondi, Pittsburgh, PA (US); Irtsam Ghazi, Pittsburgh, PA (US)

(73) Assignee: Robert Bosch GmbH, Stuttgart (DE)

(*) Notice: Subject to any disclaimer, the term of this patent is extended or adjusted under 35 U.S.C. 154(b) by 251 days.

(21) Appl. No.: 18/052,507

(22) Filed: Nov. 3, 2022

(65) Prior Publication Data

US 2024/0153524 A1    May 9, 2024

(51) Int. Cl.
*G10L 25/51* (2013.01)
*H04R 1/08* (2006.01)

(52) U.S. Cl.
CPC .................... *G10L 25/51* (2013.01)

(58) Field of Classification Search
CPC ....................................................... G10L 25/51
See application file for complete search history.

(56) References Cited

U.S. PATENT DOCUMENTS

| | | | |
|---|---|---|---|
| 10,248,744 B2 | 4/2019 | Schissler et al. | |
| 10,628,714 B2 | 4/2020 | Pradeep et al. | |
| 2015/0248884 A1* | 9/2015 | Ljolje | G10L 15/28 704/243 |
| 2016/0109284 A1 | 4/2016 | Hammershøi et al. | |
| 2018/0285767 A1* | 10/2018 | Chew | G06N 20/00 |
| 2020/0013427 A1* | 1/2020 | Boulanger | G06F 16/638 |
| 2020/0302951 A1 | 9/2020 | Deng et al. | |
| 2021/0240431 A1 | 8/2021 | Gorzel et al. | |

(Continued)

FOREIGN PATENT DOCUMENTS

JP    2007264328 A  * 10/2007

OTHER PUBLICATIONS

Niklaus et al., "3D Ken Burns Effect from a Single Image," ACM Transactions on Graphics, 2019, 38(6), 15 pages.

(Continued)

*Primary Examiner* — Mark Fischer
(74) *Attorney, Agent, or Firm* — Michael Best & Friedrich LLP

(57) ABSTRACT

A system for automatically selecting a sound recognition model for an environment based on audio data and image data associated with the environment. The system includes a camera, a microphone, a memory including a plurality of sound recognition models, and an electronic processor. The electronic processor is configured to receive the audio data associated with the environment from the microphone, receive the image data associated with the environment from the camera, and determine one or more characteristics of the environment based on the audio data and the image data. The electronic processor is also configured to select the sound recognition model from the plurality of sound recognition models based on the one or more characteristics of the environment, receive additional audio data associated with the environment from the microphone, and analyze the additional audio data using the sound recognition model to perform a sound recognition task.

16 Claims, 4 Drawing Sheets

(56) References Cited

U.S. PATENT DOCUMENTS

| | | | | |
|---|---|---|---|---|
| 2021/0312943 | A1* | 10/2021 | Kulkarni | G10L 25/78 |
| 2022/0093089 | A1* | 3/2022 | Chen | G10L 25/51 |
| 2022/0101623 | A1 | 3/2022 | Walsh et al. | |
| 2022/0164662 | A1 | 5/2022 | Saki et al. | |
| 2022/0343917 | A1 | 10/2022 | Tang et al. | |
| 2023/0336694 | A1* | 10/2023 | Wexler | G06V 20/52 |
| 2024/0112661 | A1* | 4/2024 | Blewett | H04R 1/406 |

OTHER PUBLICATIONS

Luo et al., "Consistent Video Depth Estimation," ACM Transactions on Graphics, 2020, 39(4), 13 pages.

Singh et al., "Image2Reverb: Cross-Modal Reverb Impulse Response Synthesis," Proceedings of the IEEE/CVF International Conference on Computer Vision, 2021, 22 pages.

Gamper et al., "Blind Reverberation Time Estimation Using a Convolutional Neural Network," 16th International Workshop on Acoustic Signal Enhancement, 2018, 5 pages.

Richard et al., "Deep Impulse Responses: Estimating and Parameterizing Filters with Deep Networks," IEEE International Conference on Acoustics, Speech and Signal Processing, 2022, 5 pages.

Zhang et al., "SAP-Net: Deep Learning to Predict Sound Absorption Performance of Metaporous Materials," Materials & Design, 2021, 212, 7 pages.

Hu et al., "A Two-Stage Approach to Device-Robust Acoustic Scene Classification," IEEE International Conference on Acoustics, Speech and Signal Processing, 2021, 5 pages.

Zhang et al., "Acoustic Scene Classification Using Deep CNN with Fine-Resolution Feature," Expert Systems with Applications, 2020, 143, 9 pages.

Papa et al., "A Data-Driven Approach for Acoustic Parameter Similarity Estimation of Speech Recording," IEEE International Conference on Acoustics, Speech and Signal Processing, 2022, 5 pages.

International Search Report for Application No. PCT/EP2023/079746 dated Jan. 29, 2024 (5 pages).

\* cited by examiner

AUTOMATICALLY SELECTING A SOUND RECOGNITION MODEL FOR AN ENVIRONMENT BASED ON AUDIO DATA AND IMAGE DATA ASSOCIATED WITH THE ENVIRONMENT

SUMMARY

Currently, audio-based signal processing techniques are being used to perform sound recognition tasks such as impulsive sound recognition, speech recognition, noise cancellation, and the like. Often sound recognition tasks are performed, using deep learning, by a system or electronic device equipped with a camera in addition to a microphone. For example, a system may be a robotic assistant, a security surveillance system, a digital assistant, and the like. These systems are often deployed or installed in a variety of environments, (for example, offices, schools, homes, warehouses, parking lots, and the like). Because sound propagation and background noise can vary dramatically from environment to environment, the variety of the environments in which systems that perform sound recognition tasks may be installed poses a challenge to designing and training sound recognition models (deep learning models) used to perform sound recognition tasks. For example, a system deployed in an outdoor parking lot may have to discriminated between cars backfiring, fireworks, shopping carts crashing, and the like. In another example, a system deployed in a school hallway may need to discriminate between kids talking, heating, ventilation, and air conditioning (HVAC) white noise, vacuums, and the like.

The variety of environments in which a system may be deployed and the variety of sound recognition tasks the system may need to perform, requires a system to utilize a variety of deep learning models. Each deep learning model is trained with data associated with a specific sound recognition task and environment. For example, a deep learning model may be trained to detect gunshots (a sound recognition task) outdoors on a neighborhood street (an environment), detect screaming (a sound recognition task) in a shopping mall atrium (an environment), determine what a user said (a sound recognition task) while in a home kitchen (an environment), or the like. To ensure that a sound recognition task is performed with accuracy, the system should utilize a deep learning model that is associated with the environment that the system is installed in. In some instances, the data used to train a sound recognition model is augmented to include audio recordings of sounds that are likely to generate false positives because they are similar to a sound that a sound recognition model is configured to identify and, for each audio recording of a sound, data representing a characteristic of the environment the audio recordings were captured in (for example, the impulse response time of an environment). For example, if a sound recognition model is trained to perform the sound recognition task of detecting gunfire, the augmented data may include audio recordings of cars backfiring and firecrackers.

Generally, when a user installs the system, the user selects one or more sound recognition tasks that the user wants the system to perform. Based on the sound recognition tasks that are selected, certain insights about the environment in which the system is installed may be inferred. For example, audio-based intrusion detection is activated only in indoor systems, while traffic counting is activated only in outdoor ones. However, many characteristics (for example, reverberation, an absorption coefficient of surfaces, and a depth map) of the environment cannot be determined based on the selection of sound recognition tasks made when the system is installed. Additionally, the environment may be difficult to identify due to changes in the environment throughout the day or week or the incomplete or unfinished state of the environment. Because it is difficult to determine, with specificity, the environment of a system, it is difficult for the system to determine which deep learning model of a plurality of deep learning models is best suited for performing a sound recognition task in the environment.

Embodiments, examples, aspects, and features described herein provide, among other things, a system and method for selecting a sound recognition model for an environment based on audio data and image data associated with the environment. The examples described herein, among other things, enhance the accuracy of the system in performing sound recognition tasks without requiring that a person with special training or knowledge regarding software development install the system or requiring the system include enough memory to execute sound recognition models associated with each possible environment.

One example provides an example system for automatically selecting a sound recognition model for an environment based on audio data and image data associated with the environment. The system includes a camera, a microphone, a memory including a plurality of sound recognition models, and an electronic processor. The electronic processor is configured to receive the audio data associated with the environment from the microphone, receive the image data associated with the environment from the camera, and determine one or more characteristics of the environment based on the audio data and the image data. The electronic processor is also configured to select the sound recognition model from the plurality of sound recognition models based on the one or more characteristics of the environment, receive additional audio data associated with the environment from the microphone, and analyze the additional audio data using the sound recognition model to perform a sound recognition task, wherein the sound recognition task includes generating a prediction regarding the additional audio data.

Another example provides an example method for automatically selecting a sound recognition model for an environment based on audio data and image data associated with the environment. The method includes receiving the audio data associated with the environment from a microphone, receiving the image data associated with the environment from a camera, and determining one or more characteristics of the environment based on the audio data and the image data. The method also includes selecting the sound recognition model from a plurality of sound recognition models based on the one or more characteristics of the environment, receiving additional audio data associated with the environment from the microphone, and analyzing the additional audio data using the sound recognition model to perform a sound recognition task, wherein the sound recognition task includes generating a prediction regarding the additional audio data.

Another example provides an example system for automatically selecting a sound recognition model for an environment based on image data associated with the environment. The system including a camera, a microphone, a memory including a plurality of sound recognition models, and an electronic processor. The electronic processor is configured to receive the image data associated with the environment from the camera, determine one or more characteristics of the environment based on the image data, select the sound recognition model from the plurality of sound recognition models based on the one or more characteristics of the environment. The electronic processor is also configured to receive audio data associated with the environment from the microphone and analyze the audio data using the sound recognition model to perform a sound recognition task, wherein a sound recognition task includes generating a prediction regarding the audio data.

Other aspects, features, examples, and embodiments will become apparent by consideration of the detailed description and accompanying drawings.

DETAILED DESCRIPTION

Figure 1:
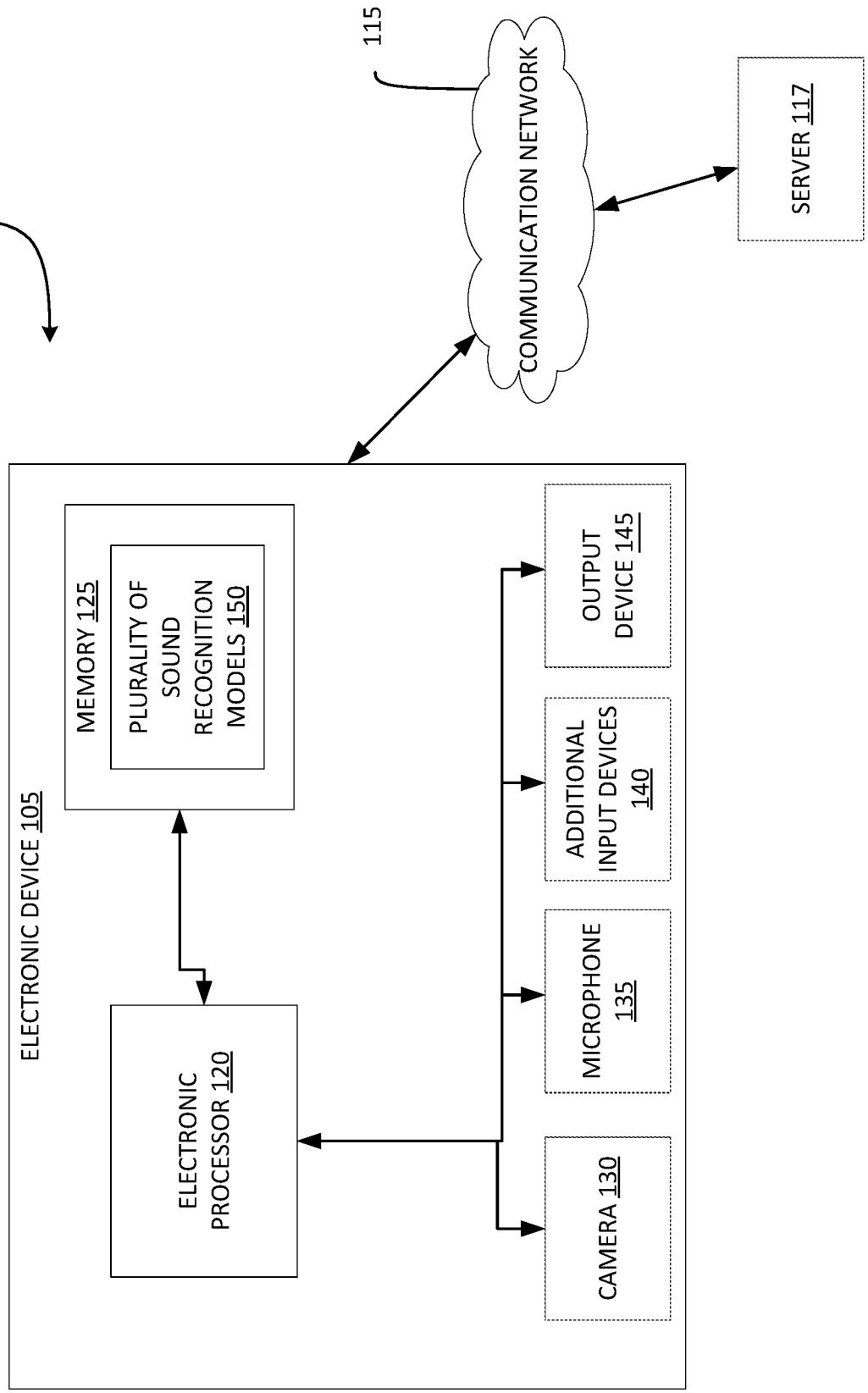
FIG. 1 is a block diagram of an example system for automatically selecting a sound recognition model for an environment based on audio data and image data associated with the environment according to one implementation.

Before any embodiments, examples, aspects, and features are explained in detail, it is to be understood that this disclosure is not intended to be limited in its application to the details of construction and the arrangement of components set forth in the following description or illustrated in the following drawings. Embodiments, examples, aspects, and features are capable of other configurations and of being practiced or of being carried out in various ways.

A plurality of hardware and software based devices, as well as a plurality of different structural components may be used to implement various embodiments, examples, aspects, and features. In addition, examples, aspects, features, and embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one example, the electronic based aspects of the invention may be implemented in software (for example, stored on non-transitory computer-readable medium) executable by one or more processors configured in centralized or distributed fashions. In some instances, "control units" and "controllers" described in the specification can include one or more electronic processors, one or more memory modules including non-transitory computer-readable medium, one or more communication interfaces, one or more application specific integrated circuits (ASICs), or other components and various connections (for example, a system bus) connecting the various components.

It should be understood that although certain drawings illustrate hardware and software located within particular devices, these depictions are for illustrative purposes only. In some examples, the illustrated components may be combined or divided into separate software, firmware and/or hardware. For example, instead of being located within and performed by a single electronic processor, logic and processing may be distributed among multiple electronic processors. Unless the context specifically indicates otherwise, regardless of how they are combined or divided, hardware and software components may be located on the same computing device or may be distributed among different computing devices connected by one or more networks or other suitable communication links.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1%, and in another example within 0.5%. The term "coupled" as used herein is defined as connected, although not necessarily directly and not necessarily mechanically. A device or structure that is "configured" in a certain way is configured in at least that way but may also be configured in ways that are not listed.

FIG. 1 illustrates an example system 100 for automatically selecting a sound recognition model for an environment based on audio data and image data associated with the environment. The system 100 includes an electronic device 105. The electronic device 105 may be a laptop or desktop computer, a tablet computer, smart phone, a security surveillance device or camera, or other computing device. In some instances, the electronic device 105 communicates over a communication network 115 with one or more other electronic devices. In one example, the electronic device 105 may be in communication with a server 117. The communication network 115 includes one or more wired networks, wireless networks, or a combination thereof that enable communications within the system 100. For example, in some configurations, the communication network 115 includes cable networks, the Internet, local area networks (LANs), wide area networks (WAN), mobile telephone networks (MTNs), and other types of networks, possibly used in conjunction with one another, to facilitate communication between the electronic device 105 and other electronic devices included in the system 100. FIG. 1 provides but one example of the components and connections of the system 100. Components and connections may be constructed in other ways than those illustrated and described herein.

The electronic device 105 includes a plurality of electrical and electronic components that provide power, operation control, and protection to the components and modules within the electronic device 105. The electronic device 105 includes, among other things, an electronic processor 120 (such as a programmable electronic microprocessor, microcontroller, or similar device), a memory 125 (for example, non-transitory, computer readable memory), a camera 130, a microphone 135, one or more other additional input devices 140, and an output device 145. The output device 145 may be, for example, a speaker, a display device, a touchscreen, or the like. In some instances, the electronic processor 120 (with software stored in the memory) generates a user interface that is displayed on the display device. The additional input devices 140 may include, for example, a keyboard, a mouse, a touchscreen (for example, the output device 145), a microphone (for example, the microphone 135), a camera (for example, the camera 130), or the like (not shown). In some instances, instead of being included in the electronic device 105, the additional input devices 140 and the output device 145 may be included in a second electronic device (not illustrated in FIG. 1) that is in communication with the electronic device 105 via the communication network 115. The electronic processor 120 is communicatively connected to the memory 125, camera 130, microphone 135, additional input devices 140, and output device 145. The electronic processor 120, in coordination with the memory 125, camera 130, microphone 135, additional input devices 140, and output device 145, is configured to implement, among other things, the methods described herein.

In the example illustrated in FIG. 1, the memory 125 includes a plurality of sound recognition models 150. Each sound recognition model of the plurality of sound recognition models 150 is trained to perform a sound recognition task in an environment. In some examples, the memory 125 may be flash memory, a secure digital (SD) card, or the like. In some instances, the electronic device 105 may include one or more memories in addition to the memory 125. For example, the electronic device 105 may include random access memory (RAM).

In some instances, the electronic device 105 may be implemented in several independent controllers (for example, programmable electronic controllers) each configured to perform specific functions or sub-functions. Additionally, the electronic device 105 may contain sub-modules that include additional electronic processors, memory, or application specific integrated circuits (ASICs) for handling input/output functions, processing of signals, and application of the methods listed below. In other instances, the electronic device 105 includes additional, fewer, or different components. Thus, the functions performed by the method 200 may also be distributed among one or more processors and one or more memories.

Figure 2:
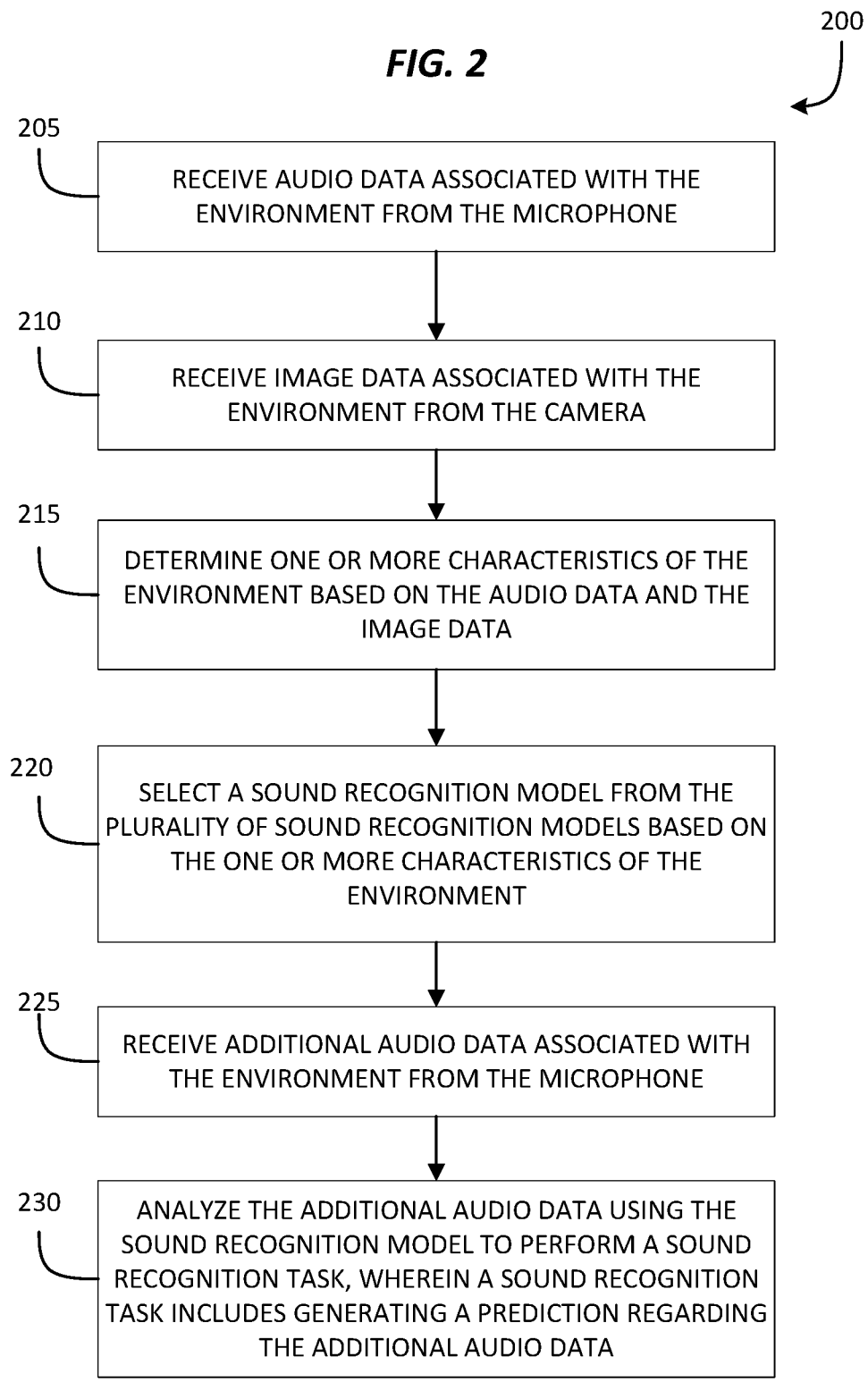
FIG. 2 is an example flowchart of a method of using the system of FIG. 1 for automatically selecting a sound recognition model for an environment based on audio data and image data associated with the environment according to one implementation.

FIG. 2 is a flow chart illustrating an example method 200 for automatically selecting a sound recognition model for an environment based on audio data and image data associated with the environment. In some instances, the method 200 is performed when the electronic device 105 is set up or installed. For example, when the electronic device 105 is powered up, the electronic processor 120 may enter a configuration mode. During the configuration mode, the electronic processor 120 may receive, via the one of the one or more additional input devices 140, a selection of one or more sound recognition tasks. In some instances, the electronic processor 120 may output, via the output device 145 a prompt requesting a selection of one or more sound recognition tasks, a list of sound recognition tasks to choose from, or both. The method 200 may also be performed by the electronic processor 120 when the electronic processor 120 is in the configuration mode. In some instances, the electronic processor 120 may enter the configuration mode when the electronic processor 120 receives a command to do so via one of the additional input devices 140.

Figure 3:
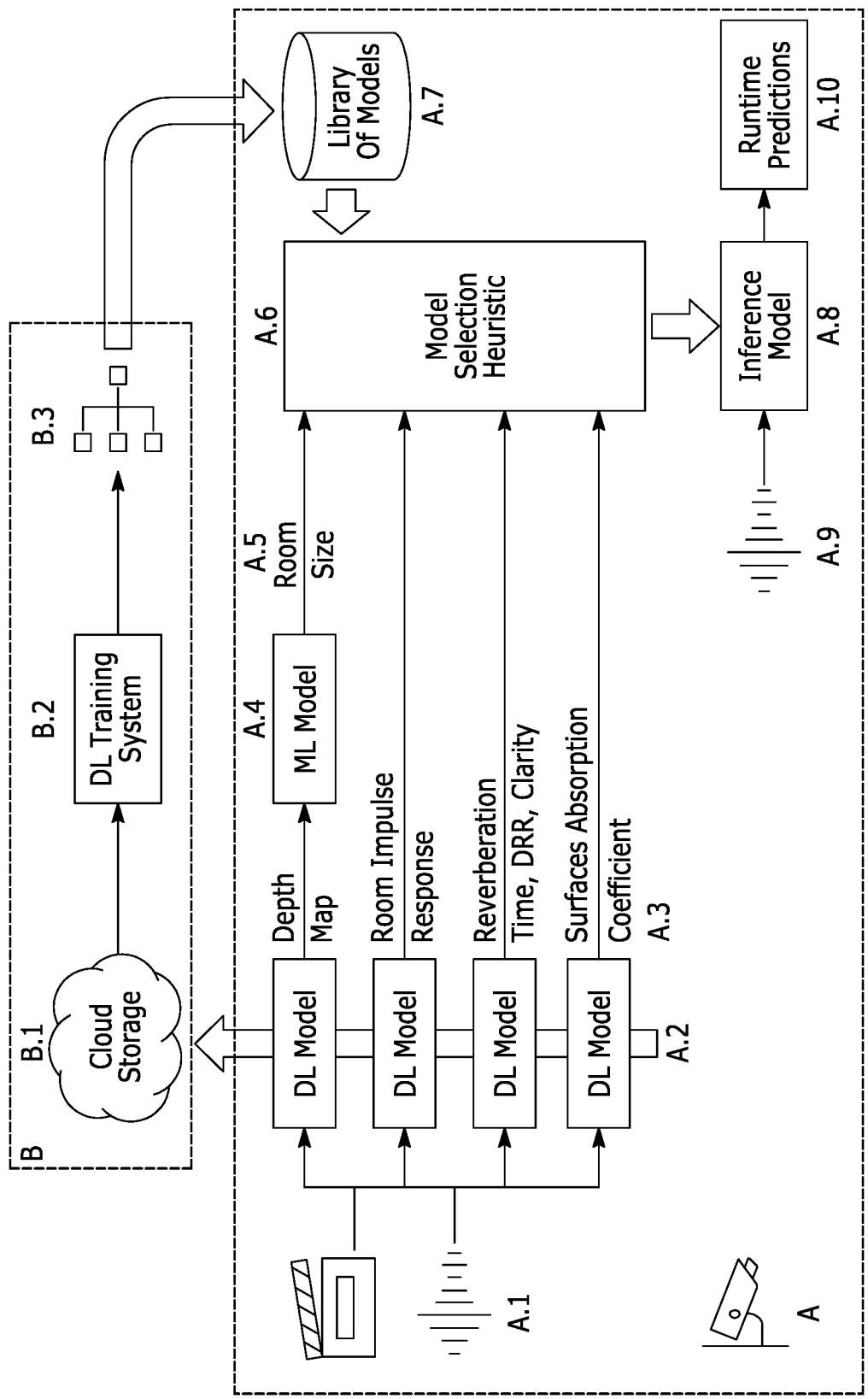
FIG. 3 is an illustrative example of functionality that may be performed by the system 100 including the method 200 for automatically selecting a sound recognition model for an environment based on audio data and image data associated with the environment according to one implementation.

FIG. 3 is an illustrative example of functionality (including the method 200) that may be performed by the system 100 for automatically selecting a sound recognition model for an environment based on audio data and image data associated with the environment. In FIG. 3, the electronic device 105 is labeled "A" and the server 117 is labeled "B."

The method 200 begins at step 205 when the electronic processor 120 receives audio data associated with the environment from the microphone (for example, the microphone 135). At step 210, the electronic processor 120 receives image data associated with the environment from the camera (for example, the camera 130). The image data may be a single still image or video collected for a predetermined amount of time. It should be understood that, in some implementations, the electronic processor 120 receives the image data before the audio data. In other implementations, the electronic processor 120 receives the image data and audio data simultaneously. In some implementations, the electronic processor 120 may not perform step 205. Steps 205 and 210 of the method 200 are illustrated as A.1 in FIG. 3.

At step 215, the electronic processor 120 determines one or more characteristics of the environment based on the audio data and the image data. The one or more characteristics may include a depth map of the environment, an acoustic impulse response associated with the environment, a reverberation time associated with the environment, an acoustic property of a surface included in the environment, an acoustic absorption coefficient of a surface included in the environment, a signal-to-noise ratio associated with the environment, a direct-to-reverberant ratio associated with the environment, a clarity index associated with the environment, a dimensional measurement of the environment, and an acoustic scene. In some instances, electronic processor 120 determines one or more characteristics of the environment based on the image data only. In some instances, the one or more characteristics are determined using one or more deep learning models. For example, a first deep learning model (see, for example, 3*D Ken Burns Effect from a Single Image* at https://arxiv.org/pdf/1909.05483v1.pdf and *Consistent Video Depth Estimation* at https://arxiv.org/abs/2004.15021), given an image (a single video frame) or a video as input, may estimate a depth map of the environment. A second deep learning model (see, for example, *Image2Reverb: Cross-Modal Reverb Impulse Response Synthesis* at https://arxiv.org/abs/2103.14201), given an image (a single video frame) or a video as input, may determine the impulse response associated with the environment. A third deep learning model (see, for example, *Blind Reverberation Time Estimation Using a Convolutional Neural Network* at https://ieeexplore.ieee.org/document/8521241 and *Deep Impulse Responses: Estimating and Parameterizing Filters with Deep Networks* at https://ieeexplore.ieee.org/document/9746135), given an audio recording as input, may determine the reverberation time associated with the environment. A fourth deep learning model (see, for example, *A Data-Driven Approach for Acoustic Parameter Similarity Estimation of Speech Recording* at https://ieeexplore.ieee.org/document/9747043), given an audio recording as input, may determine a Signal-to-Noise Ratio (SNR), reverberation time ($T_{60}$), Direct-to-Reverberant Ratio (DRR), and two different clarity indices ($C_{50}$ and $C_{80}$) associated with the environment. A fifth deep learning model (see, for example, *SAP-Net: Deep learning to predict sound absorption performance of metaporous materials* at https://www.sciencedirect.com/science/article/pii/S0264127521007115), given an audio recording as input, may determine an acoustic absorption coefficient for one or more surfaces included in the environment. A sixth deep learning model (see, for example, *A Two-Stage Approach to Device-Robust Acoustic Scene Classification* at https://arxiv.org/abs/2011.01447 and *Acoustic scene classification using deep CNN with fine-resolution feature* at https://www.sciencedirect.com/science/article/pii/S0957417419307845), given an audio recording as input, may determine, an acoustic scene of the environment from among a set of optional acoustic scenes. Step 215 of the method 200 is illustrated by A.2, A.3, A.4, and A.5 in FIG. 3. A.2 represents the deep learning models that may use the audio and video data received at A.1 or steps 205 and 210 as input to determine one or more characteristics of the environment (represented as A.3 in FIG. 3). As illustrated in FIG. 3, the characteristics of the environment (A.3) determined by the deep learning models (A.2) may be analyzed by a further machine learning model (A.4) to determine additional (for example, higher level) characteristics of the environment (A.5). For example, a depth map (a characteristic of the environment) determined by a deep learning model using image data may be used as input to a machine learning model. The machine learning model may determine environment dimensions or a dimensional measurement of the environment (for example, room size) (an additional characteristic of the environment) based on the depth map.

At step 220, the electronic processor 120 selects a sound recognition model from the plurality of sound recognition models (for example, the plurality of sound recognition models 150) based on the one or more characteristics of the environment. For example, the electronic processor 120 may use a heuristic model to select a sound recognition model. As illustrated in FIG. 3, a heuristic model or algorithm (A.6) uses the characteristics of the environment (A.3, A.5) to select, from a library of sound recognition models (A.7), the sound recognition model (A.8) that is best able to perform a sound recognition task in the environment.

The following is an example of a heuristic model utilized by the electronic processor 120 to select a sound recognition model. In this example, it is assumed that the following characteristics of the environment are determined at step 215: reverberation time ($\hat{R}$)=1.2 s, average absorption coefficient of the surfaces ($\hat{A}$)=0.5, and volume (a dimensional measurement) of the environment ($\hat{V}$)=140 m³. It is also assumed that, in this example, the sound recognition models included in the table below are included in the plurality of sound recognition models 150. The columns R (reverberation time), A (average absorption coefficient of the surfaces), and V (volume of the environment) included in the table below are the characteristics of the environment in which the sound recognition model has been trained to perform a sound recognition task.

| Model ID | R | A | V |
|---|---|---|---|
| 1 | 0.3 | 0.8 | 80 |
| 2 | 0.8 | 0.6 | 140 |

-continued

| Model ID | R | A | V |
|---|---|---|---|
| 3 | 1.3 | 0.4 | 230 |
| 4 | 1.8 | 0.2 | 300 |

For each sound recognition model included in the table, the electronic processor 120 determines the normalized distance ($d_i$) between the characteristics of the environment determined at step 215 and the characteristics of the environment in which the sound recognition model has been trained to perform a sound recognition task, using the following equation:

$$d_i = \sqrt{\left(\frac{R_i - \hat{R}}{R_{max}}\right)^2 + \left(\frac{A_i - \hat{A}}{A_{max}}\right)^2 + \left(\frac{V_i - \hat{V}}{V_{max}}\right)^2}$$

In this equation, i is the sound recognition model ID, $R_i$, $A_i$, $V_i$ are the reverberation time, average absorption coefficient, and environment volume the sound recognition model was trained for, and $R_{max}$=1.5, $A_{max}$=0.9, $V_{max}$=500 are the maximum values for the three environment characteristics. In this example, the electronic processor 120 selects the sound recognition model of the plurality of sound recognition models 150 with the smallest normalized distance. In this example, the electronic processor 120 would select sound recognition model 3. It should be understood that this is just one example of how a sound recognition model is selected. Other heuristic techniques could be utilized and the example provides just one way of selecting a sound recognition model from the plurality of sound recognition models 150 based on the one or more characteristics of the environment.

In some instances, the electronic processor 120 may select multiple sound recognition models at step 220. Each sound recognition model of the plurality of sound recognition models 150 is associated with an environment and a sound recognition task. For example, as described above, a sound recognition model may be trained to detect gunshots (a sound recognition task) outdoors on a neighborhood street (an environment), detect screaming (a sound recognition task) in a shopping mall atrium (an environment), determine what a user said (a sound recognition task) while in a home kitchen (an environment), or the like. In one example, once the electronic processor 120 has determined characteristics of the environment, the electronic processor 120 selects, for each sound recognition task selected by a user as described above, a sound recognition model best configured to perform the sound recognition task in the environment. In some instances, the heuristic model generates a confidence value associated with the selected sound recognition model. When the confidence level is below a predetermined threshold, the electronic processor 120 may use a generic sound recognition model to perform a sound recognition task instead of using the sound recognition model selected by the heuristic model to perform the sound recognition task. The generic sound recognition model may be trained and configured to perform a sound recognition task in a variety of environments (as opposed to a specific environment or limited number of environments).

At step 225, the electronic processor 120 receives additional audio data associated with the environment from the microphone 135. The additional audio data may be received by the electronic processor 120 once the electronic processor 120 has selected a sound recognition model for each sound recognition task selected by a user (or left configuration mode) and entered runtime mode. When the electronic processor 120 is in runtime mode, the electronic processor 120 may repeatedly execute steps 225 and 230 of the method 200. The additional audio data is represented by A.9 in FIG. 3.

At step 230, the electronic processor 120 analyzes the additional audio data using the sound recognition model to perform a sound recognition task, where a sound recognition task includes generating a prediction regarding the further audio data. Step 230 is represented by A.10 in FIG. 3. In one example, the electronic processor 120 analyzes the additional audio data with the sound recognition model to detect (or predict) a word or a phrase spoken by a user. Based on the predicted word or phrase, the electronic processor 120 may perform a further action. For example, if the electronic processor 120 determines that the user spoke the phrase "dim the lights," the electronic processor 120 sends a signal to dim the lights in a room that the electronic device 105 is installed in. In another example, the electronic processor 120 may analyze the additional audio data with the sound recognition model to determine whether it includes the sound of gunfire. If the electronic processor 120 determines that the audio data includes the sound of gunfire, the electronic processor 120 may send a signal to display an alert via an output device to an electronic device associated with police or security staff. In some instances, the electronic processor 120 loads the sound recognition model into RAM when performing step 230.

In some instances, the electronic device 105 may communicate with the server 117 via the communication network 115. For example, the electronic processor 120 sends the determined characteristics of the environment to the server 117. This is illustrated by B.1 in FIG. 3. Sending determined characteristics of the environment to the server 117 instead of raw audio data, video data, or both provides additional training data for the server 117 to use to train sound recognition models while preserving user privacy. The server 117 may periodically use environmental characteristics from a plurality of electronic devices to train or retrain one or more sound recognition models of the plurality of sound recognition models 150. This is represented by B.2 in FIG. 3. The server 117 may periodically send updates including one or more retrained sound recognition models to the electronic device 105. This is illustrated by B.3 in FIG. 3. When the electronic processor 120 receives an update from the server 117, the electronic processor 120 may replace sound recognition models included in the plurality of sound recognition models 150 with the one or more retrained sound recognition models included in the update received from the server 117. In some instances, the electronic processor 120 re-executes the method 200 when an update is received from the server 117.

Figure 4:
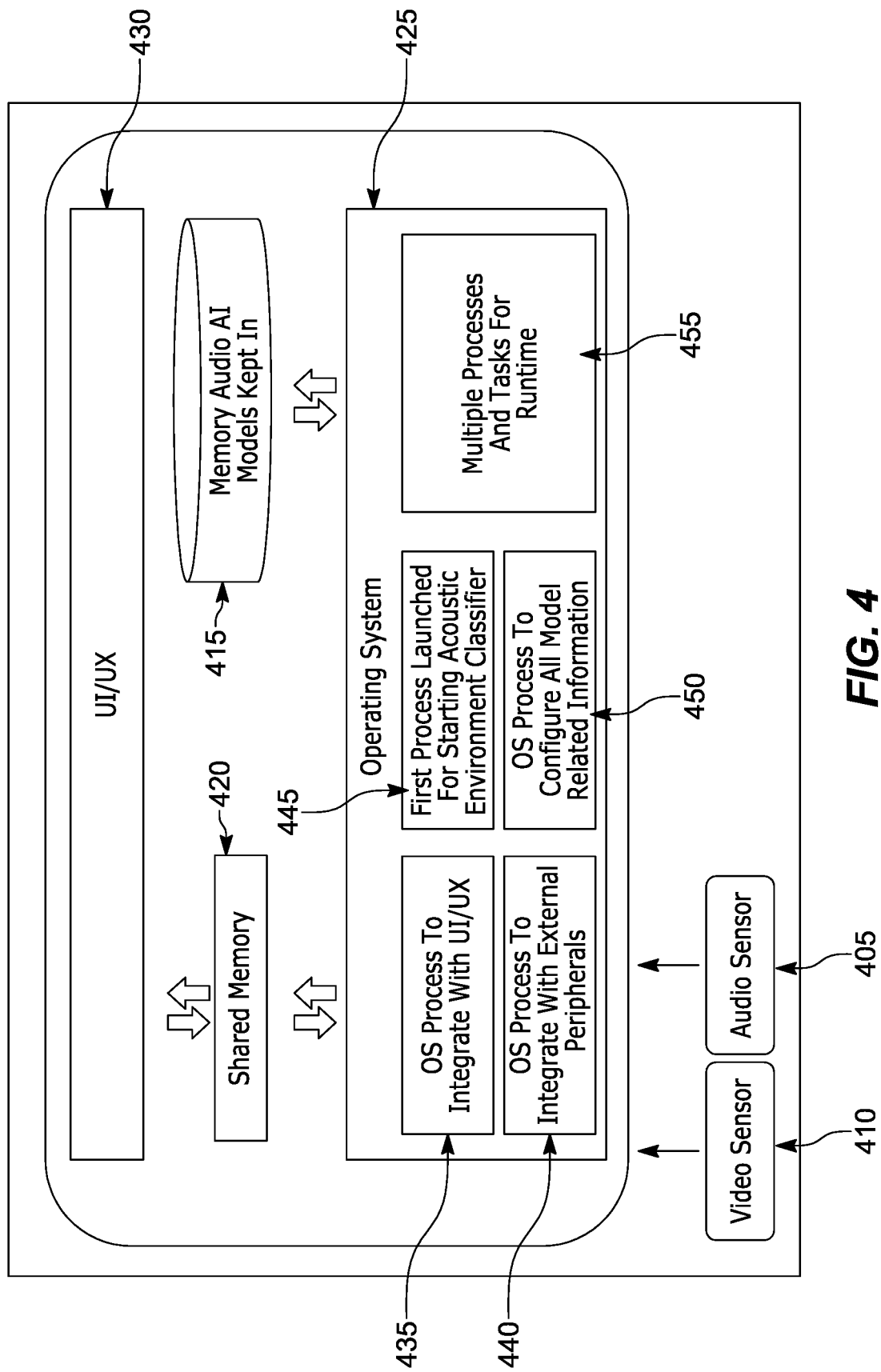
FIG. 4 is an illustrative example of incorporating automatically selecting a sound recognition model for an environment based on audio data and image data associated with the environment into existing security camera firmware architecture.

FIG. 4 is an illustrative example incorporating automatically selecting a sound recognition model for an environment based on audio data and image data associated with the environment into existing security camera firmware architecture. FIG. 4 illustrates several hardware and software components (including an audio sensor 405, a video sensor 410, a first memory 415, a second memory 420, an operating system 425, and a user interface (UI) 430) which work together to perform the functionality described herein. The operating system 425 includes several software components associated with functionality that the electronic processor 120 is configured to perform. In one example, the software components included in the operating system 425 include an operating system process to integrate with the user interface 435, an operating system process to integrate with external peripherals 440, a first process launched for starting acoustic environment classifier 445, an operating system process to configure all model related information 450, and multiple processes and tasks for runtime 455. In some instances, the operating system process to configure all model related information 450 represents one or more software components that, when executed by the electronic processor 120, cause the electronic processor 120 to perform the functionality described as being performed when the electronic processor 120 is in the configuration mode including steps 205, 210, 215, and 220 of the method 200. In some instances, the first process launched for starting acoustic environment classifier 445, represents one or more software components that, when executed by the electronic processor 120, cause the electronic processor 120 to perform step 230 of the method 200, when the electronic processor 120 is in the runtime mode. In some instances, the electronic processor 120 executes the operating system process to configure all model related information 450 prior to executing the first process launched for starting acoustic environment classifier 445.

In the foregoing specification, certain embodiments, examples, aspects, and features have been described. However, one of ordinary skill in the art appreciates that various modifications and changes can be made without departing from the scope of the subject matter set forth in the claims below. Accordingly, the specification and figures are to be regarded in an illustrative rather than a restrictive sense, and all such modifications are intended to be included within the scope of present teachings.

Thus, the embodiments, examples, aspects, and features described herein provide, among other things, a system and a method for automatically selecting a sound recognition model for an environment based on audio data and image data associated with the environment. Various features and advantages are set forth in the following claims.

What is claimed is:
1. A system for automatically selecting a sound recognition model for an environment based on audio data and image data associated with the environment, the system comprising:
 a camera;
 a microphone;
 a memory including a plurality of sound recognition models; and
 an electronic processor configured to
  receive, via an input device, a selection of one or more sound recognition tasks;
  receive the audio data associated with the environment from the microphone;
  receive the image data associated with the environment from the camera;
  determine one or more characteristics of the environment based on the audio data and the image data;
  for each of the one or more sound recognition tasks selected, select the sound recognition model from the plurality of sound recognition models based on the one or more characteristics of the environment and the selected sound recognition task;
  receive additional audio data associated with the environment from the microphone; and
  analyze the additional audio data using the sound recognition model to perform a sound recognition task, wherein the sound recognition task includes generating a prediction regarding the additional audio data.

2. The system according to claim 1, wherein the one or more characteristics include one selected from a group consisting of a depth map of the environment, an acoustic impulse response associated with the environment, a reverberation time associated with the environment, an acoustic property of a surface included in the environment, an acoustic absorption coefficient of a surface included in the environment, a signal-to-noise ratio associated with the environment, a direct-to-reverberant ratio associated with the environment, a clarity index associated with the environment, a dimensional measurement of the environments, and an acoustic scene.

3. The system according to claim 1, wherein the electronic processor is configured to determine one or more characteristics of the environment based on the audio data and the image data using one or more deep learning models.

4. The system according to claim 1, wherein each of the plurality of sound recognition models associated with an environment and is trained to perform a sound recognition task.

5. The system according to claim 1, wherein the electronic processor is configured to select a sound recognition model from the plurality of sound recognition models based on the one or more characteristics of the environment using a heuristic model.

6. The system according to claim 1, wherein the system includes a server and the electronic processor is further configured to
send the one or more characteristics of the environment to the server to be used by the server to retrain one or more sound recognition models the plurality of sound recognition models.

7. The system according to claim 6, wherein the electronic processor is further configured to
receive the one or more retrained sound recognition models from the server.

8. The system according to claim 1, wherein the system includes an electronic device installed in the environment and the camera, the microphone, the memory including the plurality of trained sound recognition models, and the electronic processor are included in the electronic device.

9. A method for automatically selecting a sound recognition model for an environment based on audio data and image data associated with the environment, the method comprising:
receiving, via an input device, a selection of one or more sound recognition tasks;
receiving the audio data associated with the environment from a microphone;
receiving the image data associated with the environment from a camera;
determining one or more characteristics of the environment based on the audio data and the image data;
for each of the one or more sound recognition tasks selected, selecting the sound recognition model from a plurality of sound recognition models based on the one or more characteristics of the environment and the selected sound recognition task;
receiving additional audio data associated with the environment from the microphone; and
analyzing the additional audio data using the sound recognition model to perform a sound recognition task, wherein the sound recognition task includes generating a prediction regarding the additional audio data.

10. The method according to claim 9, wherein the one or more characteristics include one selected from a group consisting of a depth map of the environment, an acoustic impulse response associated with the environment, a reverberation time associated with the environment, an acoustic property of a surface included in the environment, an acoustic absorption coefficient of a surface included in the environment, a signal-to-noise ratio associated with the environment, a direct-to-reverberant ratio associated with the environment, a clarity index associated with the environment, a dimensional measurement of the environment, and an acoustic scene.

11. The method according to claim 9, wherein determining one or more characteristics of the environment based on the audio data and the image data includes using one or more deep learning models to determine the one or more characteristics of the environment based on the audio data and the image data.

12. The method according to claim 9, wherein each of the plurality of sound recognition models associated with an environment and is trained to perform a sound recognition task.

13. The method according to claim 9, wherein selecting a sound recognition model from the plurality of sound recognition models based on the one or more characteristics of the environment includes using a heuristic model to selecting the trained sound recognition model from the plurality of sound recognition models based on the one or more characteristics of the environment.

14. The method according to claim 9, the method further comprising
sending the one or more characteristics of the environment to a server to be used by the server to retrain one or more sound recognition models of the plurality of sound recognition models.

15. The method according to claim 14, the method further comprising
receiving the one or more retrained sound recognition models from the server.

16. A system for automatically selecting a sound recognition model for an environment based on image data associated with the environment, the system comprising:
a camera;
a microphone;
a memory including a plurality of sound recognition models; and
an electronic processor configured to
receive, via an input device, a selection of one or more sound recognition tasks;
receive the image data associated with the environment from the camera;
determine one or more characteristics of the environment based on the image data;
for each of the one or more sound recognition tasks selected, select the sound recognition model from the plurality of sound recognition models based on the one or more characteristics of the environment and the selected sound recognition task;
receive audio data associated with the environment from the microphone; and
analyze the audio data using the sound recognition model to perform a sound recognition task, wherein a sound recognition task includes generating a prediction regarding the audio data.

* * * * *